United States Patent [19]

Eley et al.

[11] Patent Number: 5,676,402
[45] Date of Patent: Oct. 14, 1997

[54] ROTARY UNION ASSEMBLY

[76] Inventors: Craig D. Eley, P.O. Box 316; Darin L. Schollmeyer, P.O. Box 284, both of Orchard, Nebr. 68764

[21] Appl. No.: 643,581

[22] Filed: May 6, 1996

[51] Int. Cl.⁶ ........................................... F16L 3/00
[52] U.S. Cl. ................. 285/61; 285/175; 285/190; 285/276; 285/317
[58] Field of Search ........................... 285/317, 190, 285/276, 277, 906, 61, 175

[56] References Cited

U.S. PATENT DOCUMENTS

| | | | |
|---|---|---|---|
| 975,905 | 11/1910 | Taylor | 285/190 X |
| 2,099,335 | 11/1937 | Hansen | 285/276 X |
| 4,134,605 | 1/1979 | Guhne et al. | 285/328 X |
| 4,323,269 | 4/1982 | Pellene | 285/190 X |
| 4,672,998 | 6/1987 | Kozak | 285/190 X |
| 5,496,075 | 3/1996 | Ostermann | 285/190 X |

FOREIGN PATENT DOCUMENTS 1473171  3/1967  France ............................ 285/276

*Primary Examiner*—Dave W. Arola
*Attorney, Agent, or Firm*—Zarley, McKee, Thomte, Voorhees & Sease; Mark D. Frederiksen

[57] ABSTRACT

A rotary union assembly includes a rotor with a housing rotatably mounted on a forward end thereof, the rotor being selectively releasably mounted in one end of a tubular support member. The rotor includes a socket extending radially from a central shaft and a spring loaded plunger within the socket having a pin cooperable with a hole in the tubular member side wall to releasably secure the rotor in position in the tubular member. A hose barb on the rearward end of the rotor shaft permits easy installation of a resilient, flexible hose on the rotor.

8 Claims, 3 Drawing Sheets

ROTARY UNION ASSEMBLY

TECHNICAL FIELD

The present invention relates generally to rotary unions, and more particularly to an improved rotary union assembly which is easily attached to a fluid carrying tube and connected within one end of a pipe.

BACKGROUND OF THE INVENTION

A rotary union is utilized to direct fluids from a hose or conduit, through a rotor, and thence to a housing which is rotatably mounted on the rotor. In this way, fluid can be transferred from a generally stationary tube to a rotatable unit.

One application of a rotary union is in the connection of a high pressure water hose to a rotatable hose reel. The water hose would be threaded through a main tube axle, upon which the reel is rotatably mounted. The water hose included a threaded fitting fastened on one end which was then threaded to the end of the rotor of the rotary union. The rotor is then affixed to the end of the main tube axle to permit the rotary union housing to pivot about the rotor and distribute water to a hose on the hose reel.

While prior art rotary unions are an effective solution for hose reels, the cost of installing prior art unions is quite high because the installation process is time intensive as well as requiring a number of individual parts.

SUMMARY OF THE INVENTION

It is therefore a general object of the present invention to provide an improved rotary union assembly.

Another object is to provide a rotary union assembly which is simple to install within a main tube and to connect to a fluid hose.

A further object of the present invention is to provide a rotary union assembly which is economical to manufacture and install.

Yet another object is to provide a rotary union which is quick and simple to remove and replace from a hose reel.

These and other objects will be apparent to those skilled in the art.

The rotary union assembly of the present invention includes a rotor with a housing rotatably mounted on a forward end thereof, the rotor being selectively releasably mounted in one end of a tubular support member. The rotor includes a socket extending radially from a central shaft and a spring loaded plunger within the socket having a pin cooperable with a hole in the tubular member side wall to releasably secure the rotor in position in the tubular member. A hose barb on the rearward end of the rotor shaft permits easy installation of a resilient, flexible hose on the rotor.

DESCRIPTION OF THE PREFERRED EMBODIMENT

Figure 1:
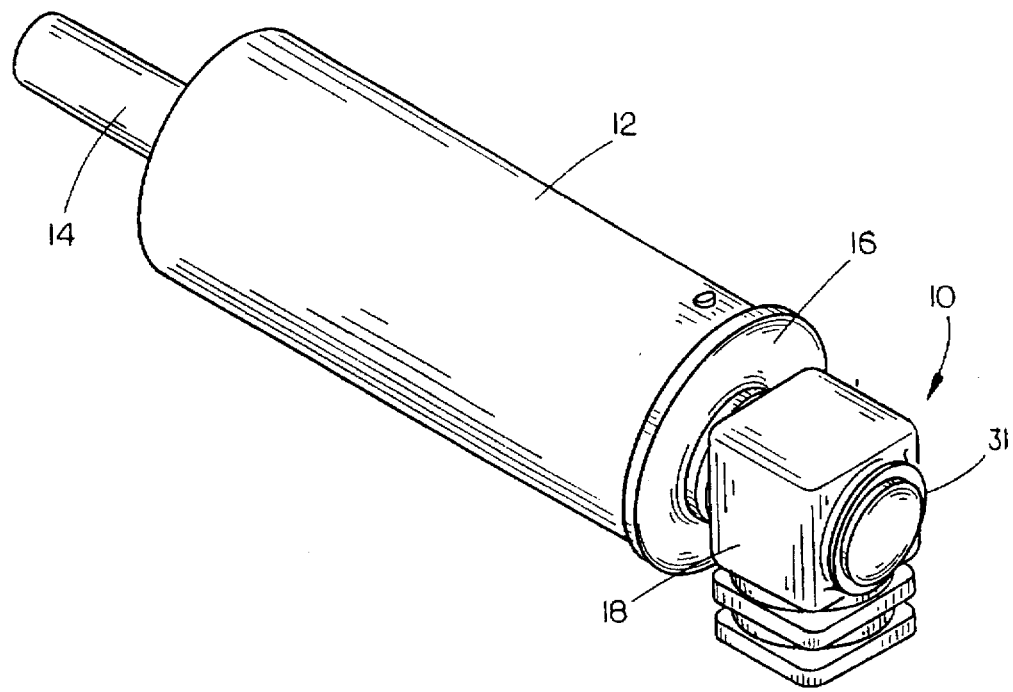
FIG. 1 is a perspective view of the rotary union assembly of the present invention installed on a tubular axle.

Referring now to the drawings, in which similar or corresponding parts are identified with the same reference numeral and more particularly to FIG. 1, the rotary union assembly of the present invention is designated generally at 10 and is shown installed on one end of a tubular axle 12. A hose 14 is journaled through axle 12 and supplies fluid to the rotor 16 of union 10 for distribution through a swivel housing 18 of union 10.

Figure 3:
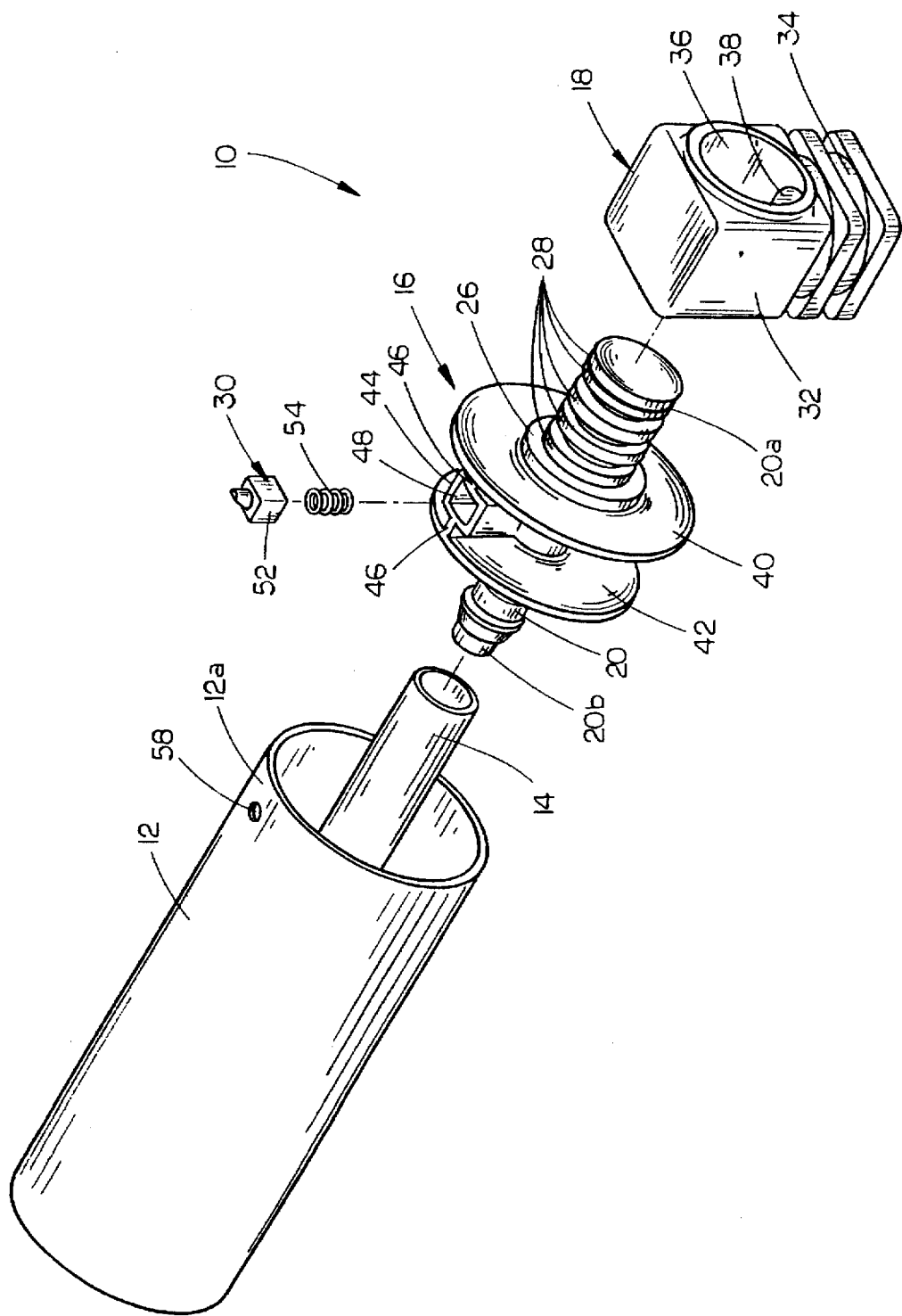
FIG. 3 is an exploded perspective view of the union on an axle.
Figure 4:
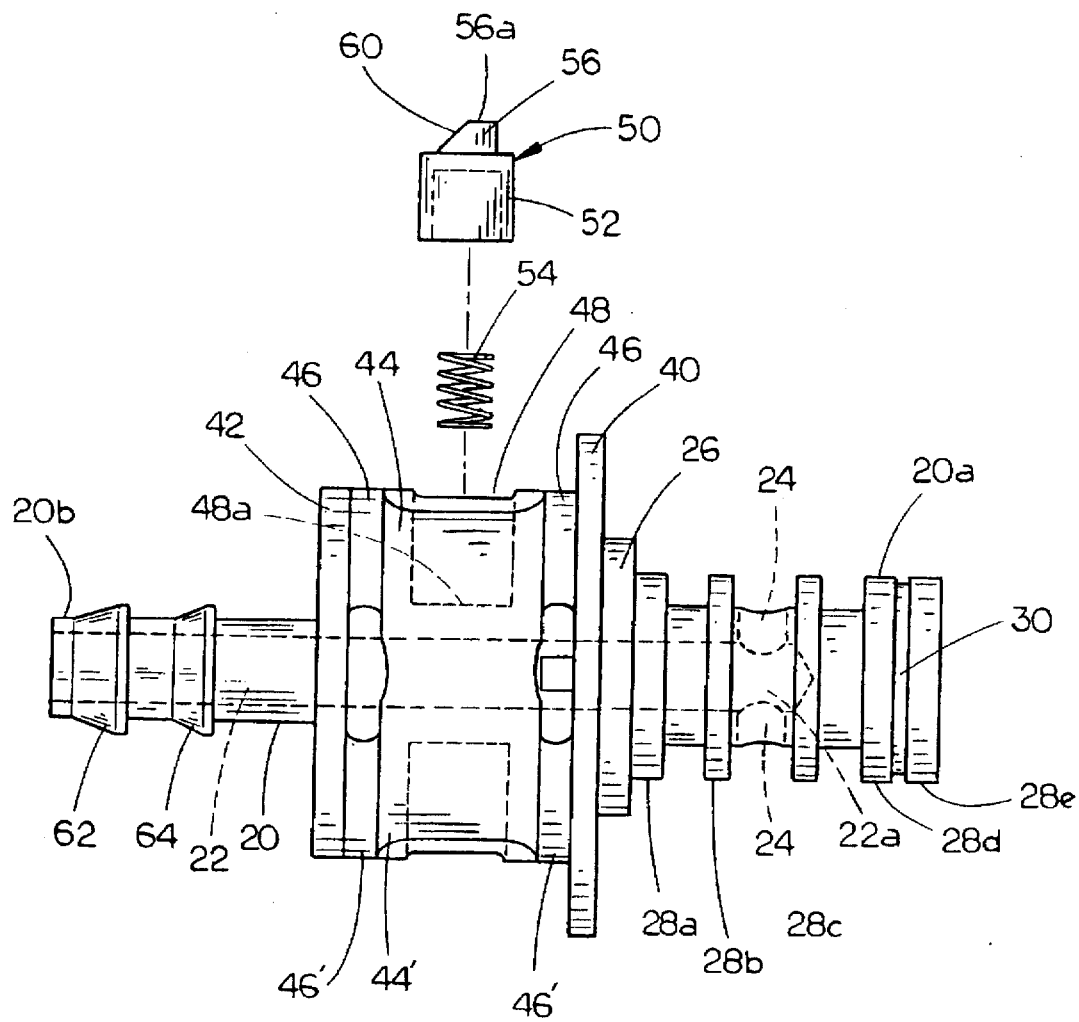
FIG. 4 is a side elevational view of the rotor portion of the union with a locking mechanism exploded therefrom.

Referring now to FIGS. 3 and 4, rotor 16 of union 10 includes a generally cylindrical central shaft 20 having forward and rearward ends 20a and 20b respectively. An aperture 22 is formed within central shaft 20 and extends forwardly from shaft rearward end 20b to a forward end 22a spaced rearwardly from the shaft forward end 20a, and oriented along the longitudinal axis of shaft 20. A pair of diametric pods 24 extend inwardly from the outer surface of shaft 20 and communicate with the forward end 22a of aperture 22, so as to exhaust fluid from aperture 22.

A bearing flange 26 projects radially from shaft 20 and is located rearwardly of ports 24, and serves as a bearing for the rotation of housing 18 on rotor 16. A plurality of spaced apart parallel rings 28a, 28b, 28c, 28d and 28e have the same diameters and project radially from shaft 20 forwardly of bearing flange 26. A groove 30 between rings 28d and 28e will receive a locking clip 31 (shown in FIGS. 1 and 2) to retain housing 18 rotatably on rotor 16 in a conventional manner.

As shown in FIG. 3, housing 18 is an elongated member having a base 32 and an arm 34. Base 32 has an aperture 36 extending therethrough with a diameter slightly greater than the diameter of rings 28, so as to have a close tolerance fit thereon. A port 38 has a longitudinal axis orthogonal to the longitudinal axis of aperture 36, and communicates therewith. Port 38 extends along a longitudinal axis of arm 34 to exhaust fluid from housing 18. In this way, housing 18 is mounted on the forward end of rotor 16 so as to rotate on rings 28, while fluid supplied from ports 24 in central shaft 20 of rotor 16 is exhausted through port 38 in housing 18 as the housing rotates on rotor 16.

As shown in FIG. 3, a central flange 40 projects radially from shaft 20 generally midway between shaft forward and rearward ends 20a and 20b. Central flange 40 has a diameter greater than the inner diameter of tubular axle 12 so as to bear against a forward end 12a of axle 12. An ancillary flange 42 projects radially from shaft 20 and is oriented parallel and spaced rearwardly of central flange 40. A first plunger housing 44 projects radially from shaft 20 and is located between central flange 40 and ancillary flange 42, with a web 46 extending from plunger housing 44 to each of flanges 40 and 42 to affix plunger housing 44 in position. A second plunger housing 44' projects radially diametric to first plunger housing 44, as shown in FIG. 4. Web 46' connects second plunger housing 44' to flanges 40 and 42 in the same manner as web 46.

First plunger housing 44 includes a radially extending socket 48 for receiving an associated plunger 50 therein. As shown in FIG. 3, socket 48 is preferably square in shape, as is plunger base 52, so as to permit radial slidable movement of plunger 50 within socket 48, while preventing rotational movement of plunger 50. A coil spring 54 is interposed between plunger 50 and socket bottom 48a, so as to bias plunger 50 radially upwardly.

Figure 2:
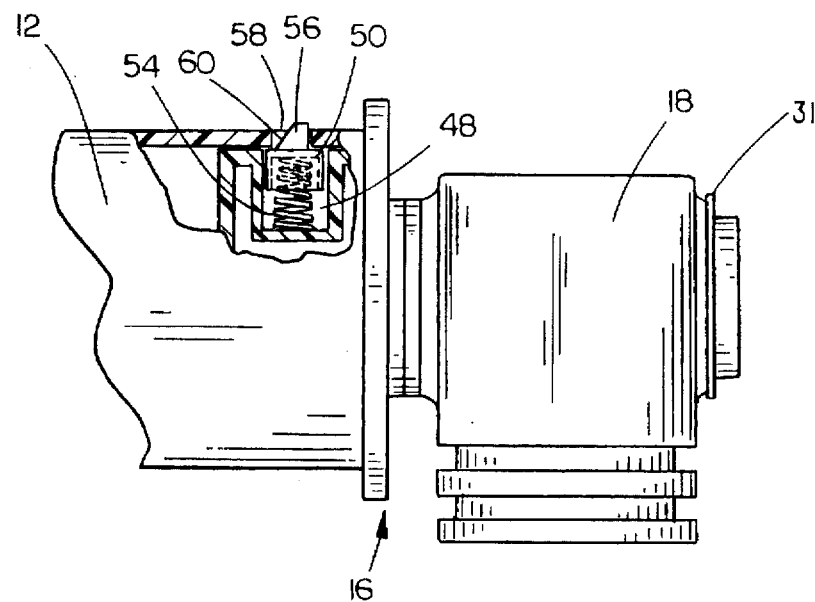
FIG. 2 is a side elevational view of FIG. 1, with a portion of the axle broken away to show the connection of the union to the axle.

A generally cylindrical pin 56 projects radially from a top wall of plunger base 52, with a diameter slightly less than the diameter of a hole 58 formed in the side wall of tubular axle 12. As shown in FIG. 4, pin 56 preferably has a top surface 56a having a beveled surface 60 extending rearwardly and downwardly to base 52. FIG. 2 shows that beveled surface 60 will assist in biasing plunger 50 radially downwardly in to socket 48 as rotor 16 is inserted within tubular axle 12. Spring 54 will then bias pin 56 radially outwardly so as to be journaled within hole 58. Pin 56 thereby prevents removal of rotor 16 forwardly out the forward end of axle 12, until pin 56 and plunger 50 is depressed radially into socket 48.

Referring once again to FIG. 4, a pair of tapered annular rings 62 and 64 are formed on the rearward end of shaft 20. Rings 62 and 64 increase in diameter from a rearward end to a forward end, so as to receive and hold one end of hose 14 in a conventional fashion. Preferably, hose 14 is a rubber, or other resilient material, so as to stretch over the larger diameter forward ends of tapered rings 62 and 64, thereby holding the hose in position. While the hose may be easily and quickly pushed over rings 62 and 64, a substantial force is required to remove the hose from the rings, thereby providing a fluid tight connection.

Whereas the invention has been shown and described in connection with the preferred embodiment thereof, many modifications, substitutions and additions may be made which are within the intended broad scope of the appended claims.

We claim:

1. A rotary union assembly, comprising:

a rotor having an elongated central shaft with forward and rearward ends;

an aperture extending forwardly through the shaft from the shaft rearward end to an aperture forward end spaced rearwardly from the shaft forward end;

a port formed in a side wall of the central shaft extending radially and fluidly connected with the aperture forward end;

a rotor housing rotatably mounted on the rotor forward end for rotation about the longitudinal axis of the shaft;

said housing having a radially projecting arm with a radially extending port therethrough, said housing port being in fluid communication with said rotor port throughout the rotation of the housing;

a central flange projecting radially from the shaft rearwardly of the housing;

means operably mounted on the central shaft, rearwardly of the central flange, for releasably securing the rotor to a tubular support member; and means removably connected to the central shaft forwardly of the housing, for releasably securing the housing on the shaft while permitting rotatable movement of the housing.

2. The rotary union assembly of claim 1, wherein said means for releasably securing the rotor includes a spring loaded plunger operably mounted within a radially disposed socket on said shaft, having a spring biasing the plunger radially outwardly from the shaft.

3. The rotary union assembly of claim 1, wherein said shaft has a hose barb on the rearward end thereof for receiving and retaining a resilient flexible hose thereon.

4. In combination:

an elongated tubular member having a forward end and a longitudinal axis;

a rotary union assembly releasably connected to the forward end of the tubular member; and means operably mounted on the rotary union assembly for releasably securing the assembly to the forward end of the tubular member;

wherein said rotary union assembly further comprises:

a rotor having an elongated central shaft with forward and rearward ends;

an aperture extending forwardly through the shaft from the shaft rearward end to an aperture forward end spaced rearwardly of the shaft forward end;

a port formed in a side wall of the shaft extending radially and fluidly connected with the aperture forward end;

a rotor housing rotatably mounted on the shaft forward end for rotation about the longitudinal axis of the shaft;

said housing having a radially projecting arm with a radially extending port therethrough, said port in fluid communication with said rotor port throughout the rotation of the housing;

a central flange projecting radially from the central shaft rearwardly of the housing and having a diameter greater than an inner diameter of the tubular member;

said means for releasably securing the rotary union to the tubular member being mounted on the rotor shaft rearwardly of said central flange; and means removably connected to the central shaft forwardly of the housing, for releasably securing the housing on the shaft while permitting rotatable movement of the housing.

5. The combination of claim 4, wherein said means for releasably securing the rotor includes a spring loaded plunger operably mounted within a radially disposed socket on said shaft, having a spring biasing the plunger radially outward from the shaft;

a pin projecting radially from an outward end of said plunger; and a hole formed in a side wall of said tubular member having a side and shape to receive said plunger pin therethrough to prevent movement of the rotor along the tubular member longitudinal axis.

6. The combination of claim 5, further comprising a resilient flexible hose journaled through said tubular member, said hose having a forward end; and said rotor rearward end having a hose barb on the rearward end thereof for receiving and retaining said hose thereon.

7. The combination of claim 5, wherein said plunger and socket have polygonal cross-sectional shapes to prevent rotation of the plunger about a radial longitudinal axis of said socket.

8. The combination of claim 7, wherein said pin includes a top surface and a side wall extending from the top surface to a plunger base, and wherein said top surface includes a beveled surface sloped rearwardly and downwardly from the top surface to the plunger base.

* * * * *